United States Patent
Ando et al.

(10) Patent No.: US 10,295,001 B2
(45) Date of Patent: May 21, 2019

(54) CONTROL DEVICE OF LOCK-UP CLUTCH

(71) Applicant: TOYOTA JIDOSHA KABUSHIKI KAISHA, Toyota-shi, Aichi-ken (JP)

(72) Inventors: Takayuki Ando, Shizuoka-ken (JP); Seiji Kuwahara, Susono (JP); Seiji Masunaga, Numazu (JP); Tsubasa Kato, Nagoya (JP); Yuki Aratsu, Kanagawa-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 102 days.

(21) Appl. No.: 15/071,887

(22) Filed: Mar. 16, 2016

(65) Prior Publication Data
US 2016/0281804 A1    Sep. 29, 2016

(30) Foreign Application Priority Data

Mar. 26, 2015    (JP) .................................. 2015-063853

(51) Int. Cl.
*F16D 48/08*    (2006.01)
*F16H 61/14*    (2006.01)
(Continued)

(52) U.S. Cl.
CPC ........... *F16D 48/08* (2013.01); *F16H 61/143* (2013.01); *F16D 48/066* (2013.01);
(Continued)

(58) Field of Classification Search
CPC ............... B60W 10/026; F16H 61/143; F16H 2061/145; F16H 2312/022; F16H 45/02;
(Continued)

(56) References Cited

U.S. PATENT DOCUMENTS

| 5,626,536 A * | 5/1997 | Kono | .................... B60W 10/06 192/3.3 |
| 8,632,439 B2 * | 1/2014 | Fujikane | ............... F16H 61/143 477/143 |

(Continued)

FOREIGN PATENT DOCUMENTS

| JP | 59-005182 B2 | 2/1984 |
| JP | H01-188758 | 7/1989 |

(Continued)

*Primary Examiner* — Edwin A Young
(74) *Attorney, Agent, or Firm* — Hunton Andrews Kurth LLP

(57) ABSTRACT

A control device of a lock-up clutch according to the disclosure is mounted on a vehicle including an engine, a transmission, a fluid-type power transmitting device interposed between the engine and the transmission, and the lock-up clutch provided on the fluid-type power transmitting device. The control device includes: a controller configured to slip-engage the lock-up clutch when accelerator opening of the vehicle changes in an accelerating direction, and configured to make a slip-engagement amount larger when a state of the fluid-type power transmitting device when the accelerator opening of the vehicle changes in the accelerating direction is a driven state than the slip-engagement amount when the state of the fluid-type power transmitting device is a driving state.

2 Claims, 13 Drawing Sheets

(51) Int. Cl.
*F16D 48/06* (2006.01)
*F16H 45/02* (2006.01)

(52) U.S. Cl.
CPC .............. *F16D 2500/10412* (2013.01); *F16D 2500/3144* (2013.01); *F16D 2500/31446* (2013.01); *F16D 2500/70406* (2013.01); *F16H 45/02* (2013.01); *F16H 2312/022* (2013.01)

(58) Field of Classification Search
CPC ........... F16D 48/08; F16D 2500/10412; F16D 2500/3144; F16D 2500/31446; F16D 2500/70406; F16D 48/066
See application file for complete search history.

(56) References Cited

U.S. PATENT DOCUMENTS

2002/0173404 A1* 11/2002 Takatori .............. F16H 61/6648
477/37
2005/0261111 A1* 11/2005 Kurogo ................. F16H 61/143
477/169
2011/0246036 A1* 10/2011 Tsutsui ................. F16H 61/143
701/67
2015/0134215 A1* 5/2015 Kawaguchi ........... F16H 61/143
701/67
2017/0120918 A1* 5/2017 Tohta .............. B60W 30/18072

FOREIGN PATENT DOCUMENTS

| JP | 2001-241544 A | 9/2001 | |
| JP | 3451802 B2 | 9/2003 | |
| JP | 2004-263732 A | 9/2004 | |
| JP | 2004-263733 A | 9/2004 | |
| JP | 2004-316752 A | 11/2004 | |
| JP | 2009-197921 A | 9/2009 | |
| JP | 2011-122619 A | 6/2011 | |
| JP | 2011-202776 A | 10/2011 | |
| JP | WO 2016035169 A1 * | 3/2016 | ............ G60W 10/04 |

* cited by examiner

FIG. 3(a) ACCELERATOR OPENING

FIG. 3(b) ENGINE TORQUE ($T_e$)

FIG. 3(c) T/C TORQUE CAPACITY ($T_{tc}$)

DRIVING→DRIVING

DELAY IN POWER TRANSMISSION

L1
L2

DRIVEN→DRIVING

FIG. 3(d) LOCK-UP CLUTCH TORQUE CAPACITY ($T_{lu}$)

L4

MAKE $T_{lu}$ LARGER BY AMOUNT TO COMPENSATE DELAY IN $T_{tc}$

L3

INHIBIT BLOW-UP OF ENGINE SPEED

FIG. 3(e) SPEED

L5
L6
L7

FIG. 3(f) VEHICLE ACCELERATION

L8
L9

DECREASE IN SHOCK

L/U AMOUNT

TIME

FIG. 5(a) ACCELERATOR OPENING
FIG. 5(b) ENGINE TORQUE ($T_e$)
FIG. 5(c) T/C TORQUE CAPACITY ($T_{tc}$)
FIG. 5(d) LOCK-UP CLUTCH TORQUE CAPACITY ($T_{lu}$)
FIG. 5(e) SPEED
FIG. 5(f) VEHICLE ACCELERATION
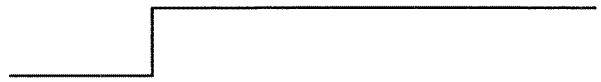
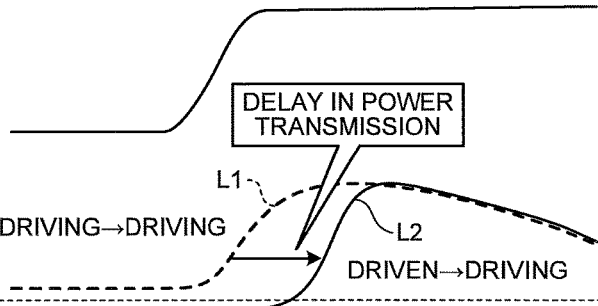
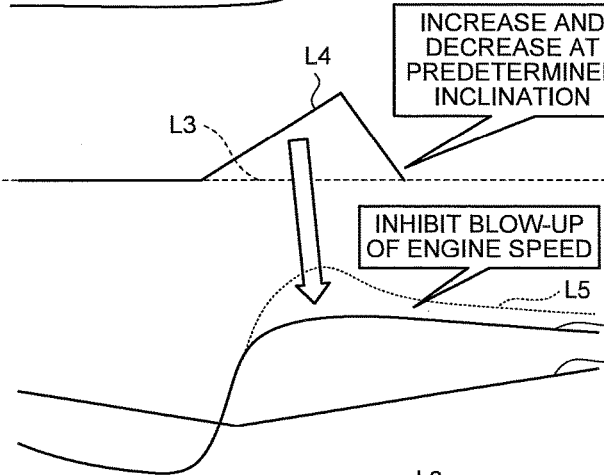
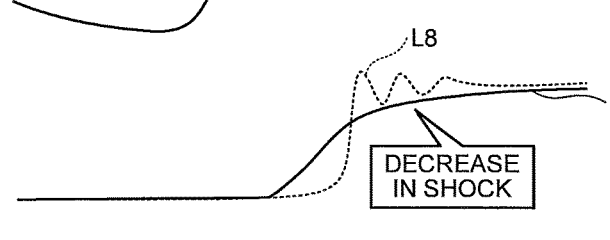

FIG. 7(a) ACCELERATOR OPENING
FIG. 7(b) ENGINE TORQUE ($T_e$)
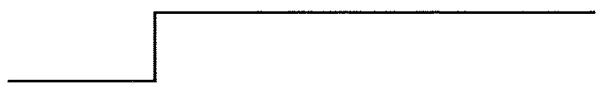
FIG. 7(c) T/C TORQUE CAPACITY ($T_{tc}$)
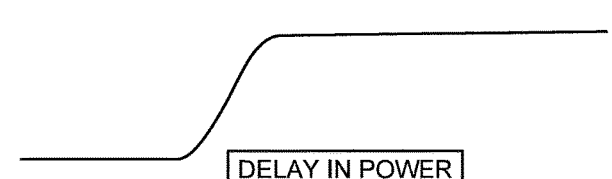
FIG. 7(d) LOCK-UP CLUTCH TORQUE CAPACITY ($T_{lu}$)
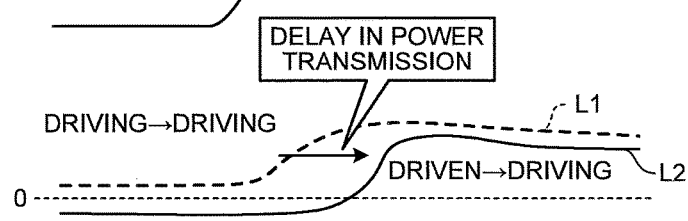
FIG. 7(e) SPEED
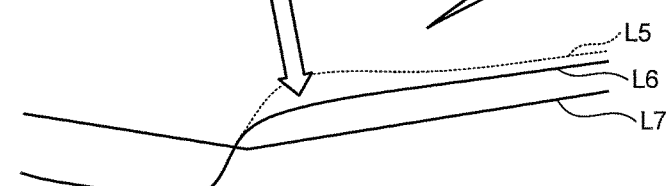
FIG. 7(f) VEHICLE ACCELERATION
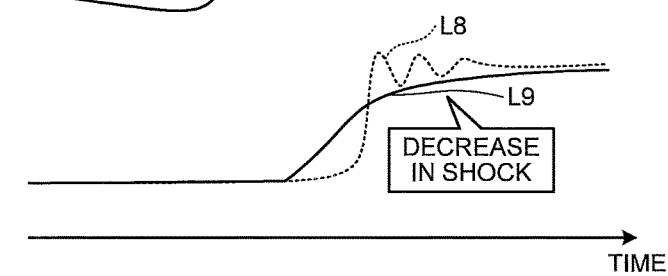
TIME

FIG. 9(a) ACCELERATOR OPENING
FIG. 9(b) ENGINE TORQUE ($T_e$)
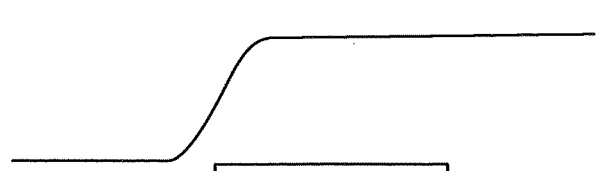
FIG. 9(c) T/C TORQUE CAPACITY ($T_{tc}$)
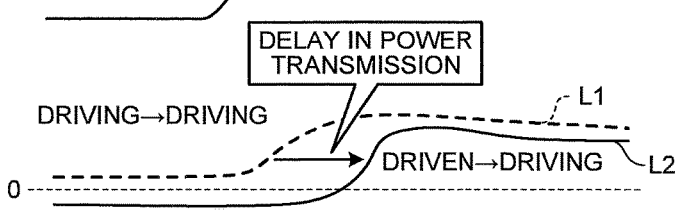
DELAY IN POWER TRANSMISSION
DRIVING→DRIVING — L1
DRIVEN→DRIVING — L2
FIG. 9(d) LOCK-UP CLUTCH TORQUE CAPACITY ($T_{lu}$)
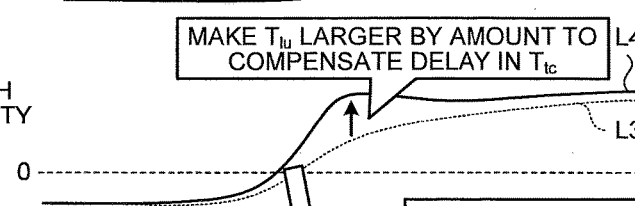
MAKE $T_{lu}$ LARGER BY AMOUNT TO COMPENSATE DELAY IN $T_{tc}$ — L4
L3
FIG. 9(e) SPEED
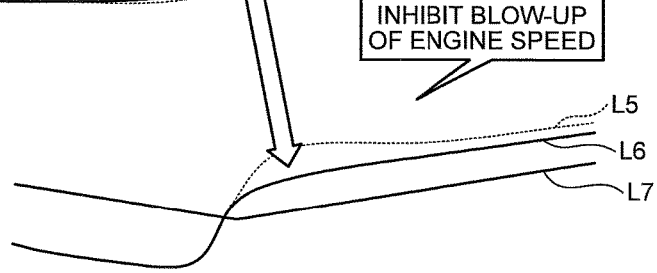
INHIBIT BLOW-UP OF ENGINE SPEED
L5
L6
L7
FIG. 9(f) VEHICLE ACCELERATION
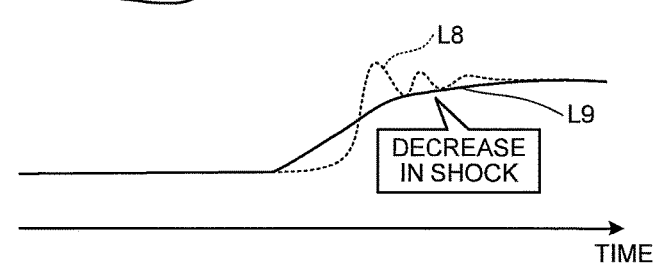
L8
L9
DECREASE IN SHOCK
TIME

ACCELERATOR OPENING

ENGINE TORQUE ($T_e$)

T/C TORQUE CAPACITY ($T_{tc}$)

LOCK-UP CLUTCH TORQUE CAPACITY ($T_{lu}$)

SPEED

VEHICLE ACCELERATION

TIME

FIG. 13(a)
(a) ACCELERATOR OPENING
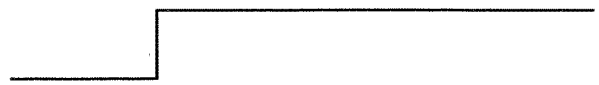
FIG. 13(b)
(b) ENGINE TORQUE ($T_e$)
FIG. 13(c)
(c) T/C TORQUE CAPACITY ($T_{tc}$)
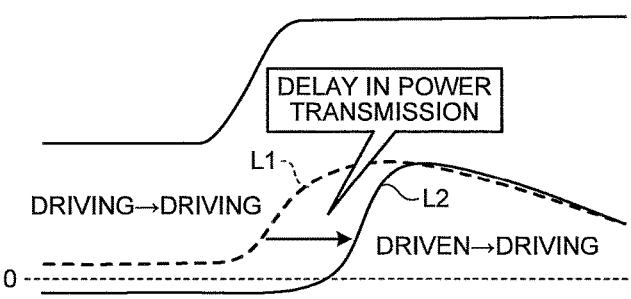
FIG. 13(d)
(d) LOCK-UP CLUTCH TORQUE CAPACITY ($T_{lu}$)
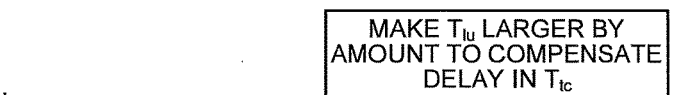
FIG. 13(e)
(e) SPEED
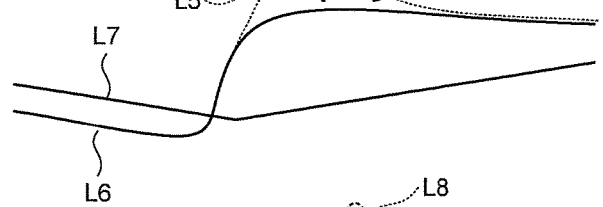
FIG. 13(f)
(f) VEHICLE ACCELERATION
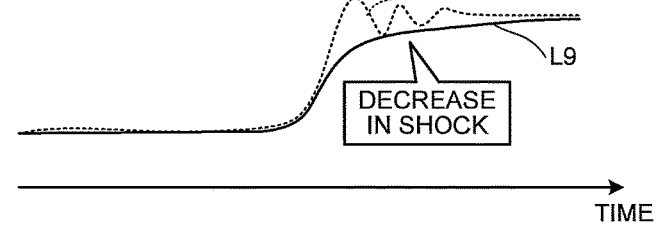
TIME

CONTROL DEVICE OF LOCK-UP CLUTCH

CROSS-REFERENCE TO RELATED APPLICATION(S)

The present application claims priority to and incorporates by reference the entire contents of Japanese Patent Application No. 2015-063853 filed in Japan on Mar. 26, 2015.

BACKGROUND OF THE DISCLOSURE

1. Field of the Disclosure

The present disclosure relates to a control device of a lock-up clutch.

2. Description of the Related Art

A control device of a lock-up clutch which executes flex start control in which the lock-up clutch is slip-engaged when a vehicle starts is conventionally known in the vehicle provided with the lock-up clutch capable of directly connecting input and output members of a fluid-type power transmitting device forming a part of a power transmission path between an engine and a drive wheel and a linear solenoid valve which controls an engagement hydraulic pressure which allows the lock-up clutch to perform engaging operation. Such control device of the lock-up clutch includes one which improves responsiveness of the lock-up clutch to the flex start control by increasing the engagement hydraulic pressure of the lock-up clutch before the flex start control starts (refer to Japanese Patent Application Laid-open No. 2011-202776).

However, the conventional control device of the lock-up clutch increases the engagement hydraulic pressure of the lock-up clutch without consideration of a state of the fluid-type power transmitting device before the flex start control starts. Therefore, according to the conventional lock-up clutch control device, a blow-up amount of an engine speed might increase due to an insufficient slip-engagement amount of the lock-up clutch and torque shock might occur due to rapid transmission of output torque of the engine with delay when the state of the fluid-type power transmitting device shifts from a driven state to a driving state after the flex start control starts.

There is a need for a control device of a lock-up clutch capable of inhibiting increase in a blow-up amount of an engine speed and occurrence of torque shock when acceleration control such as a flex start control starts.

BRIEF SUMMARY

It is an object of the disclosure to at least partially solve the problems in the conventional technology.

A control device of a lock-up clutch according to the disclosure is mounted on a vehicle including an engine, a transmission, a fluid-type power transmitting device interposed between the engine and the transmission, and the lock-up clutch provided on the fluid-type power transmitting device, and includes: a controller configured to slip-engage the lock-up clutch when accelerator opening of the vehicle changes in an accelerating direction, and configured to make a slip-engagement amount larger when a state of the fluid-type power transmitting device when the accelerator opening of the vehicle changes in the accelerating direction is a driven state than the slip-engagement amount when the state of the fluid-type power transmitting device is a driving state.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3(a) to FIG. 3(f) are timing charts for illustrating the lock-up clutch control process according to the first embodiment of the disclosure;

FIG. 5(a) to FIG. 5(f) are timing charts for illustrating a variation of the lock-up clutch control process according to the first embodiment of the disclosure;

FIG. 7(a) to FIG. 7(f) are timing charts for illustrating the lock-up clutch control process according to the second embodiment of the disclosure;

FIG. 9(a) to FIG. 9(f) are timing charts for illustrating the lock-up clutch control process according to the third embodiment of the disclosure;

FIG. 13(a) to FIG. 13(f) are timing charts for illustrating the lock-up clutch control process according to the fifth embodiment of the disclosure.

DETAILED DESCRIPTION OF THE PREFERRED EMBODIMENTS

A control device of a lock-up clutch according to one embodiment of the disclosure is hereinafter described with reference to the drawings.

Configuration of Vehicle

A configuration of a vehicle to which the control device of the lock-up clutch according to one embodiment of the disclosure is applied is first described with reference to FIG. 1.

Figure 1:
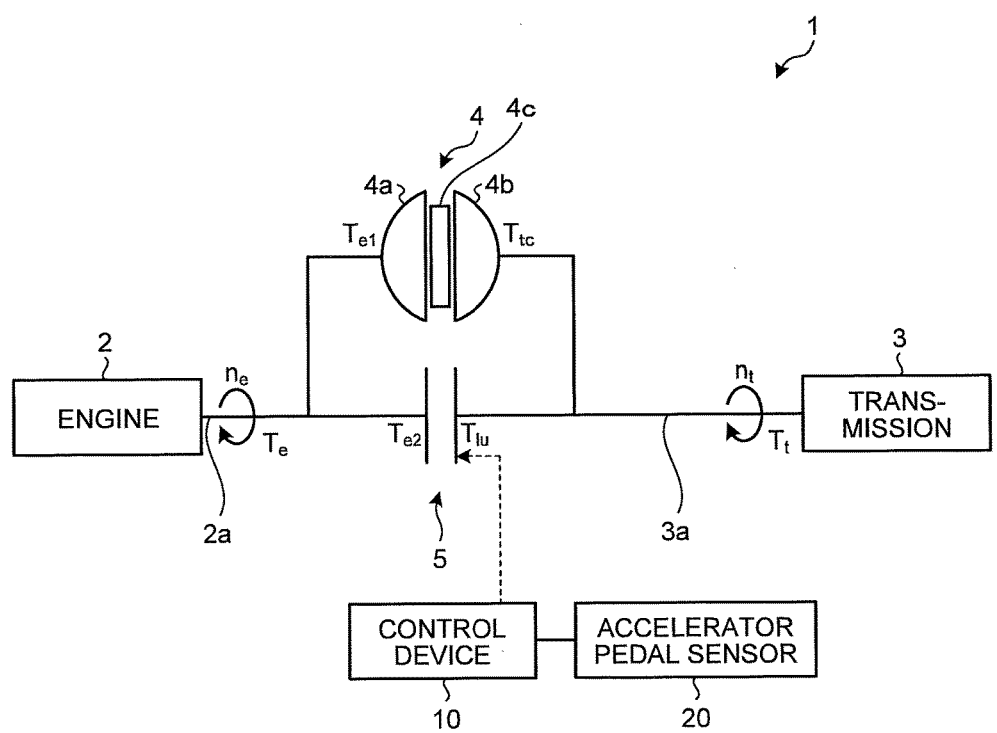
FIG. 1 is a schematic diagram illustrating a configuration of a vehicle to which a control device of a lock-up clutch according to one embodiment of the disclosure is applied.

FIG. 1 is a schematic diagram illustrating the configuration of the vehicle to which the control device of the lock-up clutch according to one embodiment of the disclosure is applied. As illustrated in FIG. 1, a vehicle 1 to which the control device of the lock-up clutch according to one embodiment of the disclosure is applied is provided with an engine 2, a transmission 3, a torque converter 4, and a lock-up clutch 5 as main components.

The engine 2 is an internal-combustion engine such as a gasoline engine and a diesel engine which generates driving force by combustion of fuel injected into a cylinder, for example. Meanwhile, reference signs $n_e$ and $T_e$ in the drawing represent a speed (hereinafter, engine speed) of the engine 2 and output torque, respectively.

The transmission 3 transmits output torque $T_t$ which is a sum of output torque (torque capacity) $T_{tc}$ of the torque converter 4 and output torque (torque capacity) $T_{lu}$ of the lock-up clutch 5 to a drive wheel not illustrated after changing a speed thereof. Examples of the transmission 3 may include an automatic transmission (AT), a continuously variable transmission (CVT) and the like. Meanwhile, a reference sign $n_t$ in the drawing represents a turbine speed being a rotational speed of an input shaft of the transmission 3 (output shaft of the torque converter 4).

The torque converter 4 provided with a pump impeller 4a corresponding to an input rotational member coupled to a crankshaft 2a of the engine 2, a turbine runner 4b corresponding to an output rotational member coupled to the transmission 3 through a turbine shaft 3a, and a stator 4c provided between the pump impeller 4a and the turbine runner 4b through a one-way clutch not illustrated is a fluid power transmitting device which transmits power through fluid. Although the torque converter 4 is arranged between the engine 2 and the transmission 3 in this embodiment, it is also possible to arrange a fluid type power transmitting device such as a fluid coupling in place of the torque converter 4. Meanwhile, a reference sign $T_{e1}$ in the drawing represents input torque of the torque converter 4.

In the torque converter 4 having such a configuration, the fluid flows from a side of the turbine runner 4b to a side of the pump impeller 4a in a state in which the stator 4c rotates (state in which the torque is not amplified) in a driven state in which a speed ratio (turbine speed $n_t$/engine speed $n_e$) is larger than one. On the other hand, in a driving state in which the speed ratio is not larger than one, the fluid flows from the side of the pump impeller 4a to the side of the turbine runner 4b in a state in which the stator 4c is fixed (state in which the torque is amplified).

The lock-up clutch 5 in a fully-engaged state mechanically directly connects an input side and an output side of the torque converter 4 to each other to disable a fluid power transmitting function by the pump impeller 4a and the turbine runner 4b of the torque converter 4. An engaged state of the lock-up clutch 5 is controlled among a disengaged state, a slip-engaged state (semi-engaged state), and a fully-engaged state by control by a control device 10 to be described later. Meanwhile, a reference sign $T_{e2}$ in the drawing represents input torque of the lock-up clutch 5.

Configuration of Control Device

A configuration of the control device of the lock-up clutch according to one embodiment of the disclosure is next described with reference to FIG. 1.

As illustrated in FIG. 1, the control device 10 of the lock-up clutch (hereinafter, abbreviated as control device 10) according to one embodiment of the disclosure is formed of a microcomputer provided with a CPU (central processing unit), a RAM (random access memory), a ROM (read only memory), an input/output interface and the like. The CPU uses a temporary storage function of the RAM and executes signal processing according to a computer program stored in advance in the ROM. Various control constants and various maps are stored in advance in the ROM. The control device 10 controls an engagement amount of the lock-up clutch 5 based on detection signals input from various sensors such as an accelerator pedal sensor 20 which detects an operational amount of an accelerator pedal (accelerator opening) of the vehicle.

The control device 10 of the lock-up clutch having such configuration inhibits increase in blow-up amount of the engine speed and occurrence of torque shock when acceleration control starts by executing a lock-up clutch control process described hereinafter. Operation of the control device 10 when executing the lock-up clutch control process according to first to fifth embodiments of the disclosure is hereinafter described with reference to FIGS. 2 to 13.

Lock-Up Clutch Control Process

First Embodiment

Figure 2:
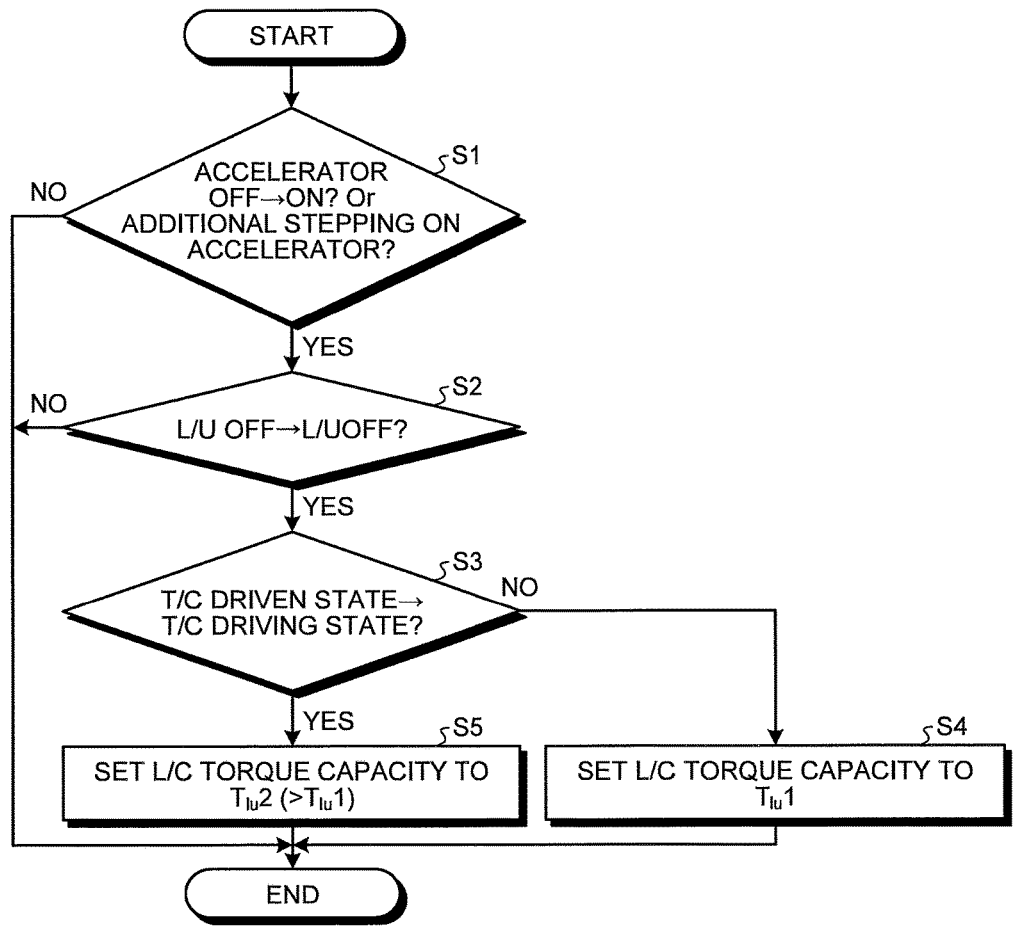
FIG. 2 is a flowchart illustrating a flow of a lock-up clutch control process according to a first embodiment of the disclosure.
Figure 4:
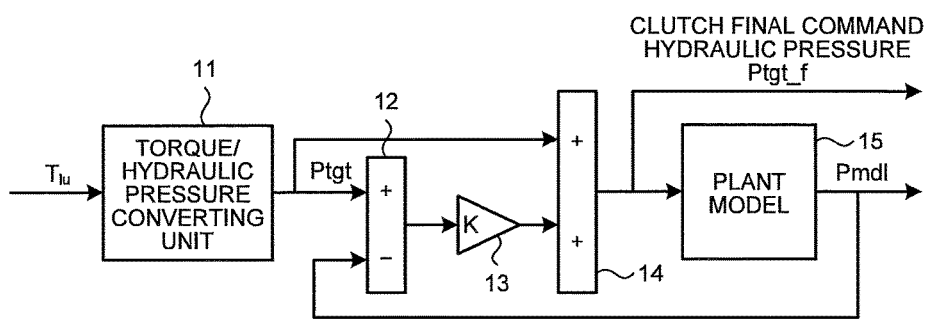
FIG. 4 is a block diagram illustrating a configuration example of a circuit for compensating delay in a hydraulic pressure command value of the lock-up clutch.

Operation of a control device 10 when executing a lock-up clutch control process according to a first embodiment of the disclosure is first described with reference to FIGS. 2 to 5(f). FIG. 2 is a flowchart illustrating a flow of the lock-up clutch control process according to the first embodiment of the disclosure. FIG. 3(a) to FIG. 3(f) are timing charts for illustrating the lock-up clutch control process according to the first embodiment of the disclosure. FIG. 4 is a block diagram illustrating a configuration example of a circuit for compensating delay in a hydraulic pressure command value of the lock-up clutch. FIG. 5(a) to FIG. 5(f) are timing charts for illustrating a variation of the lock-up clutch control process according to the first embodiment of the disclosure.

The flowchart illustrated in FIG. 2 starts when an ignition switch of a vehicle is switched from an off-state to an on-state and the lock-up clutch control process shifts to a process at step S1. The lock-up clutch control process is repeatedly executed in each predetermined control period while the ignition switch of the vehicle is in the on-state.

In the process at step S1, the control device 10 determines whether accelerator opening changes in an accelerating direction (change amount>0) based on an output signal of an accelerator pedal sensor 20. Specifically, the control device 10 determines whether an accelerator pedal is operated when the accelerator pedal is not operated and whether the accelerator opening increases when the accelerator pedal is operated. As a result of the determination, when the accelerator opening changes in the accelerating direction (Yes at step S1), the control device 10 shifts the lock-up clutch control process to a process at step S2. On the other hand, when the accelerator pedal opening does not change in the accelerating direction (No at step S1), the control device 10 finishes a series of lock-up clutch control processes.

In the process at step S2, the control device 10 determines whether a lock-up clutch 5 maintains a disengaged (L/U OFF) state based on a lock-up line and a flex lock-up line determined in advance. As a result of the determination, when the lock-up clutch 5 maintains the disengaged state (Yes at step S2), the control device 10 shifts the lock-up clutch control process to a process at step S3. On the other hand, when the lock-up clutch 5 does not maintain the disengaged state (No at step S2), the control device 10 finishes a series of lock-up clutch control processes.

In the process at step S3, the control device 10 determines whether a state of a torque converter 4 is a driven state based on a current speed ratio. As a result of the determination, when the state of the torque converter 4 is the driven state (Yes at step S3), the control device 10 determines that the state of the torque converter 4 shifts from the driven state to a driving state and shifts the lock-up clutch control process to a process at step S5. On the other hand, when the state of the torque converter 4 is the driving state (No at step S3), the control device 10 determines that the torque converter 4 maintains the driving state and shifts the lock-up clutch control process to a process at step S4.

In the process at step S4, the control device 10 sets torque capacity $T_{lu}$ of the lock-up clutch 5 to torque capacity $T_{lu}1$. According to this, the process at step S4 is completed and a series of lock-up clutch control processes ends.

In the process at step S5, the control device 10 sets the torque capacity $T_{lu}$ of the lock-up clutch 5 to torque capacity $T_{lu}2$ (>torque capacity $T_{lu}1$). Herein, a feedforward target value u of the torque capacity $T_{lu}$ of the lock-up clutch 5 is represented by Mathematical Formula (1) to be described below by using an engine speed $n_e$, output torque $T_e$ of an engine 2, inertia torque $I_e$ of the engine 2, and torque capacity $T_{tc}$ of the torque converter 4. Therefore, it is possible to calculate the feedforward target value u of the torque capacity $T_{lu}$ of the lock-up clutch 5 by setting an arbitrary target engine speed $n_e$ and calculating the torque capacity $T_{tc}$ of the torque converter 4 as the torque capacity of the torque converter 4 obtained from the speed ratio.

$$u=T_e-I_e\dot{n}_e-T_{tc} \tag{1}$$

However, when the state of the torque converter 4 shifts from the driven state to the driving state, delay in torque transmission occurs due to inertia change and the like of fluid, so that the torque capacity $T_{tc}$ of the torque converter 4 increases with delay as compared to a case in which the driving state is maintained (curve L1 illustrated in FIG. 3(c)) as indicated by curve L2 in FIG. 3(c). Therefore, in the lock-up clutch control process, the control device 10 makes the torque capacity $T_{lu}$ of the lock-up clutch 5 larger than that when the driving state is maintained (curve L3 illustrated in FIG. 3(d)) as indicated by curve L4 in FIG. 3(d) such that output torque of the torque converter 4 rapidly increases. That is, the control device 10 makes a slip-engagement amount of the lock-up clutch 5 larger when the state of the torque converter 4 when the accelerator opening of the vehicle changes in the accelerating direction is the driven state than that when the state of the torque converter 4 is the driving state.

Meanwhile, although the torque capacity $T_{lu}$ of the lock-up clutch 5 is made larger when it shifts from the driven state to the driving state in this embodiment, it is also possible that the lock-up clutch 5 is not allowed to have the torque capacity $T_{lu}$ when the driving state is maintained and the lock-up clutch 5 is temporarily allowed to have the torque capacity $T_{lu}$ when it shifts from the driven state to the driving state.

It is desirable to estimate a delay time elapsed before a hydraulic pressure of the lock-up clutch 5 reaches the hydraulic pressure corresponding to a hydraulic pressure command value and advance a timing to make the torque capacity $T_{lu}$ of the lock-up clutch 5 larger by the estimated delay time. According to this, it is possible to inhibit deterioration in controllability with the delay in an engagement hydraulic pressure of the lock-up clutch 5.

It is desirable to compress a clutch pack after the accelerator opening changes in the accelerating direction before the lock-up clutch 5 begins to have the torque capacity. According to this, the lock-up clutch 5 may have the torque capacity with excellent responsiveness.

According to this, a blow-up amount of the engine speed does not increase as indicated by curve L5 in FIG. 3(e) and the engine speed becomes stable as indicated by curve L6 in FIG. 3(e). Meanwhile, curve L7 illustrated in FIG. 3(e) indicates a turbine speed. Vehicle acceleration does not oscillate by torque shock as indicated by curve L8 in FIG. 3(f) and the vehicle acceleration becomes stable as indicated by curve L9 in FIG. 3(f).

Meanwhile, when the torque capacity of the torque converter 4 when there is no delay in the torque capacity $T_{tc}$ is represented as $Cn_e^2$ by using a capacity coefficient C and a delay amount of the torque capacity $T_{tc}$ of the torque converter 4 is represented as G, the feedforward target value u of the torque capacity $T_{lu}$ of the lock-up clutch 5 in consideration of the delay in the torque capacity $T_{tc}$ of the torque converter 4 is represented by following Mathematical Formula (2). When the delay G in the torque capacity $T_{tc}$ of the torque converter 4 in Mathematical Formula (2) is primary delay of a time constant T, the feedforward target value u of the torque capacity $T_{lu}$ of the lock-up clutch 5 in consideration of the delay in the torque capacity $T_{tc}$ of the torque converter 4 is represented by following Mathematical Formula (3). Herein, the above-described capacity coefficient C and time constant T are values identified by experiment.

$$u=T_e-I_e\dot{n}_e-G\cdot Cn_e^2 \tag{2}$$

$$u=T_e-I_e\dot{n}_e-(1-e^{-t/T})\cdot Cn_e^2 \tag{3}$$

In actual control, in order to control the torque capacity $T_{lu}$ of the lock-up clutch 5, as illustrated in FIG. 4, a differential unit 12 calculates a differential value between an estimated hydraulic pressure of the lock-up clutch 5 calculated by a plant model 15 and a target hydraulic pressure Ptgt calculated by a torque/hydraulic pressure converting unit 11 from a target torque capacity, a multiplier 13 multiples a gain K by the calculated differential value, and an adder 14 adds a multiplied value of the target hydraulic pressure Ptgt to this value, and the obtained value is output as a final command hydraulic pressure Ptgt_f of the lock-up clutch 5. According to this, the process at step S5 is completed and a series of lock-up clutch control processes ends.

Meanwhile, although the torque capacity $T_{lu}$ of the lock-up clutch 5 is increased when the state of the torque converter 4 shifts from the driven state to the driving state in this embodiment, it is also possible to increase the torque capacity $T_{lu}$ of the lock-up clutch 5 for a predetermined time at a predetermined inclination and decrease the same at a predetermined inclination as indicated by line L4 in FIG. 5(d) at that time. Herein, a predetermined inclination and a predetermined time are set in advance according to target output torque of the engine 2, the turbine speed, and a target differential rotational speed of the torque converter 4. According to such process, it is possible to inhibit increase in the torque shock when the torque capacity $T_{tc}$ of the torque converter 4 rapidly increases because the lock-up clutch 5 has too much torque capacity $T_{lu}$.

Second Embodiment

Figure 6:
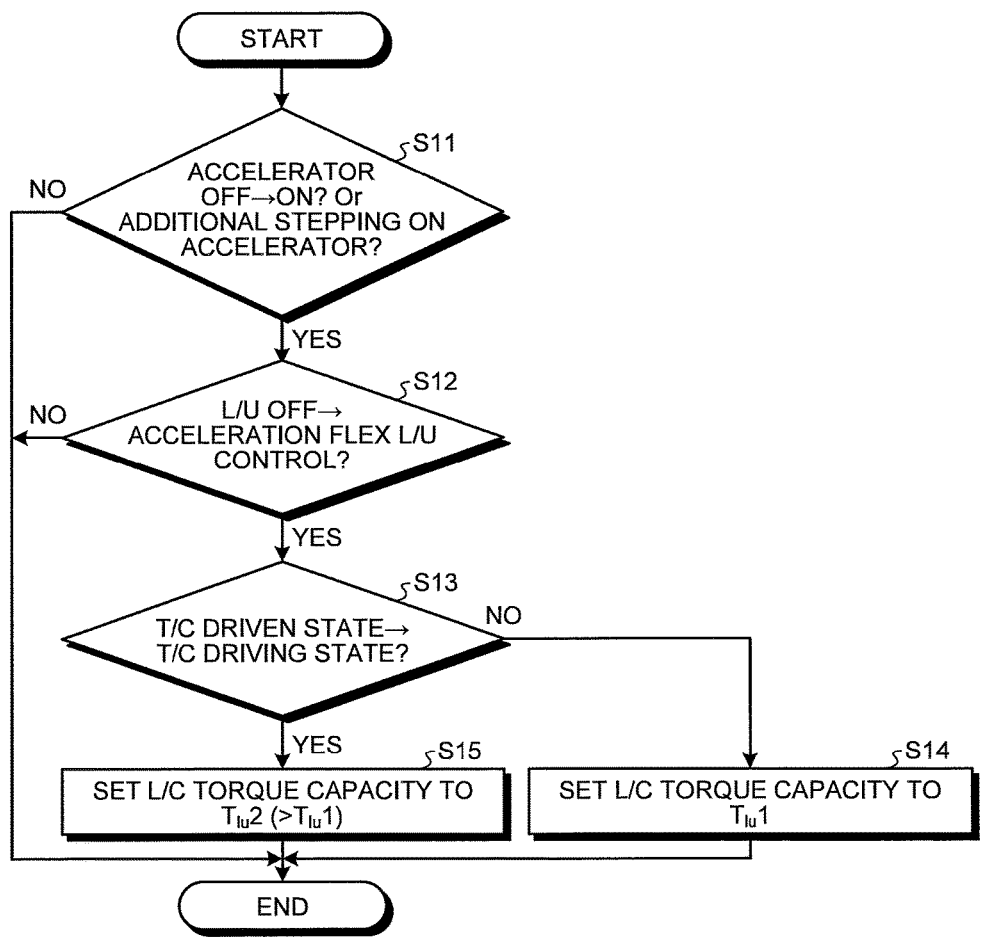
FIG. 6 is a flowchart illustrating a flow of a lock-up clutch control process according to a second embodiment of the disclosure.

Operation of a control device 10 when executing a lock-up clutch control process according to a second embodiment of the disclosure is next described with reference to FIGS. 6 to 7(f). FIG. 6 is a flowchart illustrating a flow of the lock-up clutch control process according to the second embodiment of the disclosure. FIG. 7(a) to FIG. 7(f) are timing charts for illustrating the lock-up clutch control process according to the second embodiment of the disclosure.

The flowchart illustrated in FIG. 6 starts when an ignition switch of a vehicle is switched from an off-state to an on-state and the lock-up clutch control process shifts to a process at step S11. The lock-up clutch control process is repeatedly executed in each predetermined control period while the ignition switch of the vehicle is in the on-state.

In the process at step S11, the control device 10 determines whether accelerator opening changes in an accelerating direction based on an output signal of an accelerator pedal sensor 20. As a result of the determination, when the accelerator opening changes in the accelerating direction (Yes at step S11), the control device 10 shifts the lock-up clutch control process to a process at step S12. On the other hand, when the accelerator pedal opening does not change in the accelerating direction (No at step S11), the control device 10 finishes a series of lock-up clutch control processes.

In the process at step S12, the control device 10 determines whether a control state of a lock-up clutch 5 shifts from a disengaged (L/U OFF) state to an acceleration flex lock-up control state in which the lock-up clutch 5 is slip-engaged when the vehicle accelerates based on a lock-up line and a flex lock-up line determined in advance. As a result of the determination, when the control state of the lock-up clutch 5 shifts from the disengaged state to the acceleration flex lock-up control state (Yes at step S12), the control device 10 shifts the lock-up clutch control process to a process at step S13. On the other hand, when the control state of the lock-up clutch 5 does not shift from the disengaged state to the acceleration flex lock-up control state (No at step S12), the control device 10 finishes a series of lock-up clutch control processes.

In the process at step S13, the control device 10 determines whether a state of a torque converter 4 is a driven state based on a current speed ratio. As a result of the determination, when the state of the torque converter 4 is the driven state (Yes at step S13), the control device 10 determines that the state of the torque converter 4 shifts from the driven state to a driving state and shifts the lock-up clutch control process to a process at step S15. On the other hand, when the state of the torque converter 4 is the driving state (No at step S13), the control device 10 determines that the torque converter 4 maintains the driving state and shifts the lock-up clutch control process to a process at step S14.

In the process at step S14, the control device 10 sets torque capacity $T_{lu}$ of the lock-up clutch 5 to torque capacity $T_{lu}1$. According to this, the process at step S14 is completed and a series of lock-up clutch control processes ends.

In the process at step S15, the control device 10 sets the torque capacity $T_{lu}$ of the lock-up clutch 5 to torque capacity $T_{lu}2$ (>torque capacity $T_{lu}1$). Specifically, the control device 10 makes the torque capacity $T_{lu}$ of the lock-up clutch 5 larger than that when the driving state is maintained (curve L3 illustrated in FIG. 7(d)) as indicated by curve L4 in FIG. 7(d) such that output torque of the torque converter 4 rapidly increases. According to this, a blow-up amount of an engine speed does not increase as indicated by curve L5 in FIG. 7(e) and the engine speed becomes stable as indicated by curve L6 in FIG. 7(e). Meanwhile, curve L7 illustrated in FIG. 7(e) indicates a turbine speed. Vehicle acceleration does not oscillate by torque shock as indicated by curve L8 in FIG. 7(f) and the vehicle acceleration becomes stable as indicated by curve L9 in FIG. 7(f). According to this, the process at step S15 is completed and a series of lock-up clutch control processes ends.

Third Embodiment

Figure 8:
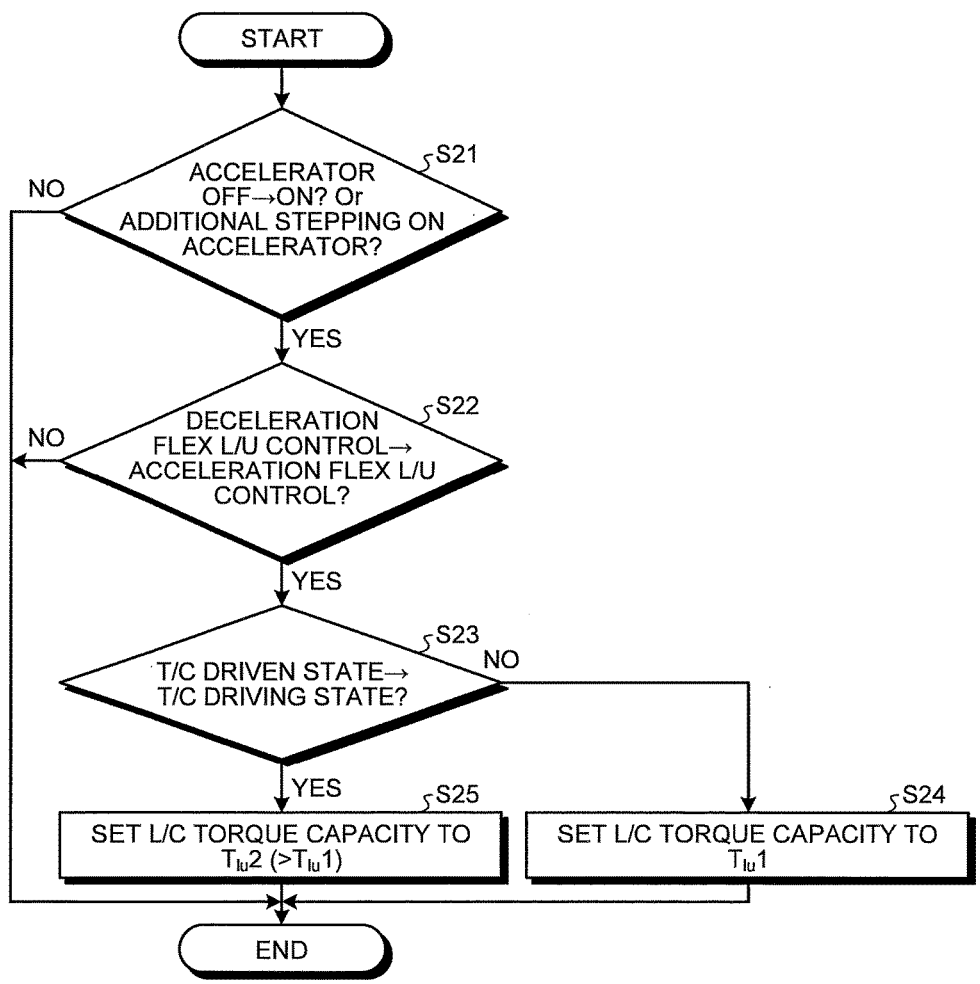
FIG. 8 is a flowchart illustrating a flow of a lock-up clutch control process according to a third embodiment of the disclosure.

Operation of a control device 10 when executing a lock-up clutch control process according to a third embodiment of the disclosure is next described with reference to FIGS. 8 to 9(f). FIG. 8 is a flowchart illustrating a flow of the lock-up clutch control process according to the third embodiment of the disclosure. FIG. 9(a) to FIG. 9(f) are timing charts for illustrating the lock-up clutch control process according to the third embodiment of the disclosure.

The flowchart illustrated in FIG. 8 starts when an ignition switch of a vehicle is switched from an off-state to an on-state and the lock-up clutch control process shifts to a process at step S21. The lock-up clutch control process is repeatedly executed in each predetermined control period while the ignition switch of the vehicle is in the on-state.

In the process at step S21, the control device 10 determines whether accelerator opening changes in an accelerating direction based on an output signal of an accelerator pedal sensor 20. As a result of the determination, when the accelerator opening changes in the accelerating direction (Yes at step S21), the control device 10 shifts the lock-up clutch control process to a process at step S22. On the other hand, when the accelerator opening does not change in the accelerating direction (No at step S21), the control device 10 finishes a series of lock-up clutch control processes.

In the process at step S22, the control device 10 determines whether a control state of a lock-up clutch 5 shifts from a deceleration flex lock-up control state in which the lock-up clutch 5 is slip-engaged when the vehicle decelerates to an acceleration flex lock-up control state based on a lock-up line and a flex lock-up line determined in advance. As a result of the determination, when the control state of the lock-up clutch 5 shifts from the deceleration flex lock-up control state to the acceleration flex lock-up control state (Yes at step S22), the control device 10 shifts the lock-up clutch control process to a process at step S23. On the other hand, when the control state of the lock-up clutch 5 does not shift from the deceleration flex lock-up control state to the acceleration flex lock-up control state (No at step S22), the control device 10 finishes a series of lock-up clutch control processes.

In the process at step S23, the control device 10 determines whether a state of a torque converter 4 is a driven state based on a current speed ratio. As a result of the determination, when the state of the torque converter 4 is the driven state (Yes at step S23), the control device 10 determines that the state of the torque converter 4 shifts from the driven state to a driving state and shifts the lock-up clutch control process to a process at step S25. On the other hand, when the state of the torque converter 4 is the driving state (No at step S23), the control device 10 determines that the torque converter 4 maintains the driving state and shifts the lock-up clutch control process to a process at step S24.

In the process at step S24, the control device 10 sets torque capacity $T_{lu}$ of the lock-up clutch 5 to torque capacity $T_{lu}1$. According to this, the process at step S24 is completed and a series of lock-up clutch control processes ends.

In the process at step S25, the control device 10 sets the torque capacity $T_{lu}$ of the lock-up clutch 5 to torque capacity $T_{lu}2$ (>torque capacity $T_{lu}1$). Specifically, the control device 10 makes the torque capacity $T_{lu}$ of the lock-up clutch 5 larger than that when the driving state is maintained (curve L3 illustrated in FIG. 9(d)) as indicated by curve L4 in FIG. 9(d) such that output torque of the torque converter 4 rapidly increases. According to this, a blow-up amount of an engine speed does not increase as indicated by curve L5 in FIG. 9(e) and the engine speed becomes stable as indicated by curve L6 in FIG. 9(e). Meanwhile, curve L7 illustrated in FIG. 9(e) indicates a turbine speed. Vehicle acceleration does not oscillate by torque shock as indicated by curve L8 in FIG.

9(f) and the vehicle acceleration becomes stable as indicated by curve L9 in FIG. 9(f). According to this, the process at step S25 is completed and a series of lock-up clutch control processes ends.

Fourth Embodiment

Figure 10:
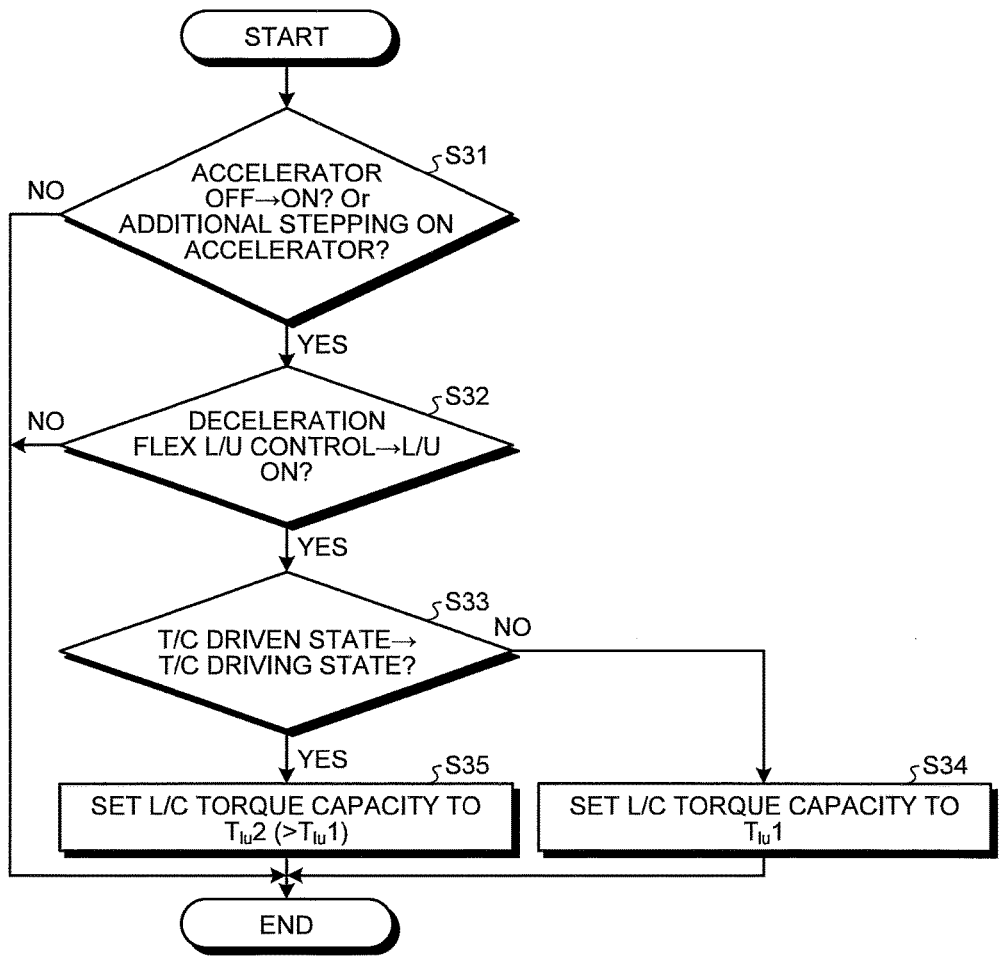
FIG. 10 is a flowchart illustrating a flow of a lock-up clutch control process according to a fourth embodiment of the disclosure.
Figure 11A:
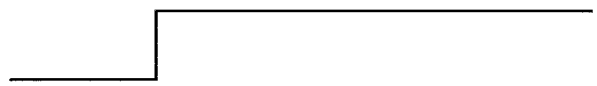
FIG. 11(a) to FIG. 11(f) are timing charts for illustrating the lock-up clutch control process according to the fourth embodiment of the disclosure.
Figure 11B:
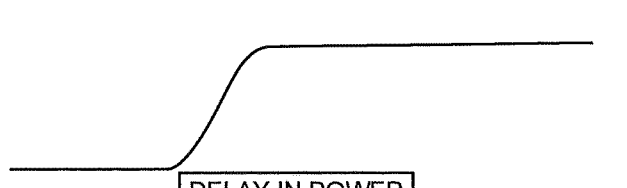
Figure 11C:
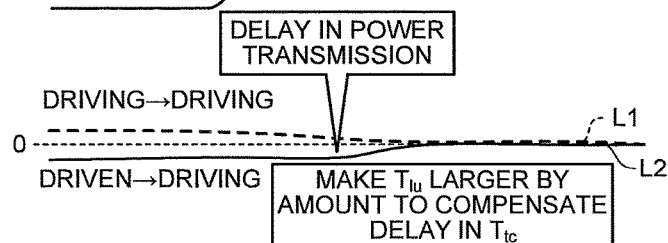
Figure 11D:
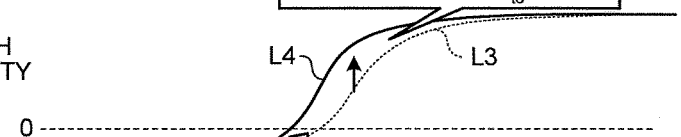
Figure 11E:
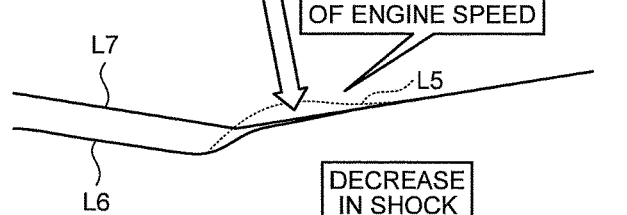
Figure 11F:
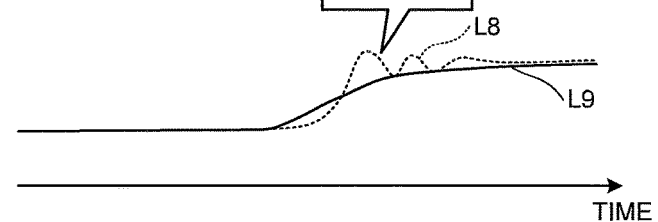

Operation of a control device 10 when executing a lock-up clutch control process according to a fourth embodiment of the disclosure is next described with reference to FIGS. 10 to 11(f). FIG. 10 is a flowchart illustrating a flow of the lock-up clutch control process according to the fourth embodiment of the disclosure. FIG. 11(a) to FIG. 11(f) are timing charts for illustrating the lock-up clutch control process according to the fourth embodiment of the disclosure.

The flowchart illustrated in FIG. 10 starts when an ignition switch of a vehicle is switched from an off-state to an on-state and the lock-up clutch control process shifts to a process at step S31. The lock-up clutch control process is repeatedly executed in each predetermined control period while the ignition switch of the vehicle is in the on-state.

In a process at step S31, the control device 10 determines whether accelerator opening changes in an accelerating direction based on an output signal of an accelerator pedal sensor 20. As a result of the determination, when the accelerator opening changes in the accelerating direction (Yes at step S31), the control device 10 shifts the lock-up clutch control process to a process at step S32. On the other hand, when the accelerator opening does not change in the accelerating direction (No at step S31), the control device 10 finishes a series of lock-up clutch control processes.

In the process at step S32, the control device 10 determines whether a control state of the lock-up clutch 5 shifts from a deceleration flex lock-up control state to an engaged (L/U ON) state based on a lock-up line and a flex lock-up line determined in advance. As a result of the determination, when the control state of the lock-up clutch 5 shifts from the deceleration flex lock-up control state to the engaged state (Yes at step S32), the control device 10 shifts the lock-up clutch control process to a process at step S33. On the other hand, when the control state of the lock-up clutch 5 does not shift from the deceleration flex lock-up control state to the engaged state (No at step S32), the control device 10 finishes a series of lock-up clutch control processes.

In the process at step S33, the control device 10 determines whether a state of a torque converter 4 is a driven state based on a current speed ratio. As a result of the determination, when the state of the torque converter 4 is the driven state (Yes at step S33), the control device 10 determines that the state of the torque converter 4 shifts from the driven state to a driving state and shifts the lock-up clutch control process to a process at step S35. On the other hand, when the state of the torque converter 4 is the driving state (No at step S33), the control device 10 determines that the torque converter 4 maintains the driving state and shifts the lock-up clutch control process to a process at step S34.

In the process at step S34, the control device 10 sets torque capacity $T_{lu}$ of the lock-up clutch 5 to torque capacity $T_{lu}1$. According to this, the process at step S34 is completed and a series of lock-up clutch control processes ends.

In the process at step S35, the control device 10 sets the torque capacity $T_{lu}$ of the lock-up clutch 5 to torque capacity $T_{lu}2$ (>torque capacity $T_{lu}1$). Specifically, the control device 10 makes the torque capacity $T_{lu}$ of the lock-up clutch 5 larger than that when the driving state is maintained (curve L3 illustrated in FIG. 11(d)) as indicated by curve L4 in FIG. 11(d) such that output torque of the torque converter 4 rapidly increases. According to this, a blow-up amount of an engine speed does not increase as indicated by curve L5 in FIG. 11(e) and the engine speed becomes stable as indicated by curve L6 in FIG. 11(e). Meanwhile, curve L7 illustrated in FIG. 11(e) indicates a turbine speed. Vehicle acceleration does not oscillate by torque shock as indicated by curve L8 in FIG. 11(f) and the vehicle acceleration becomes stable as indicated by curve L9 in FIG. 11(f). According to this, the process at step S35 is completed and a series of lock-up clutch control processes ends.

Fifth Embodiment

Figure 12:
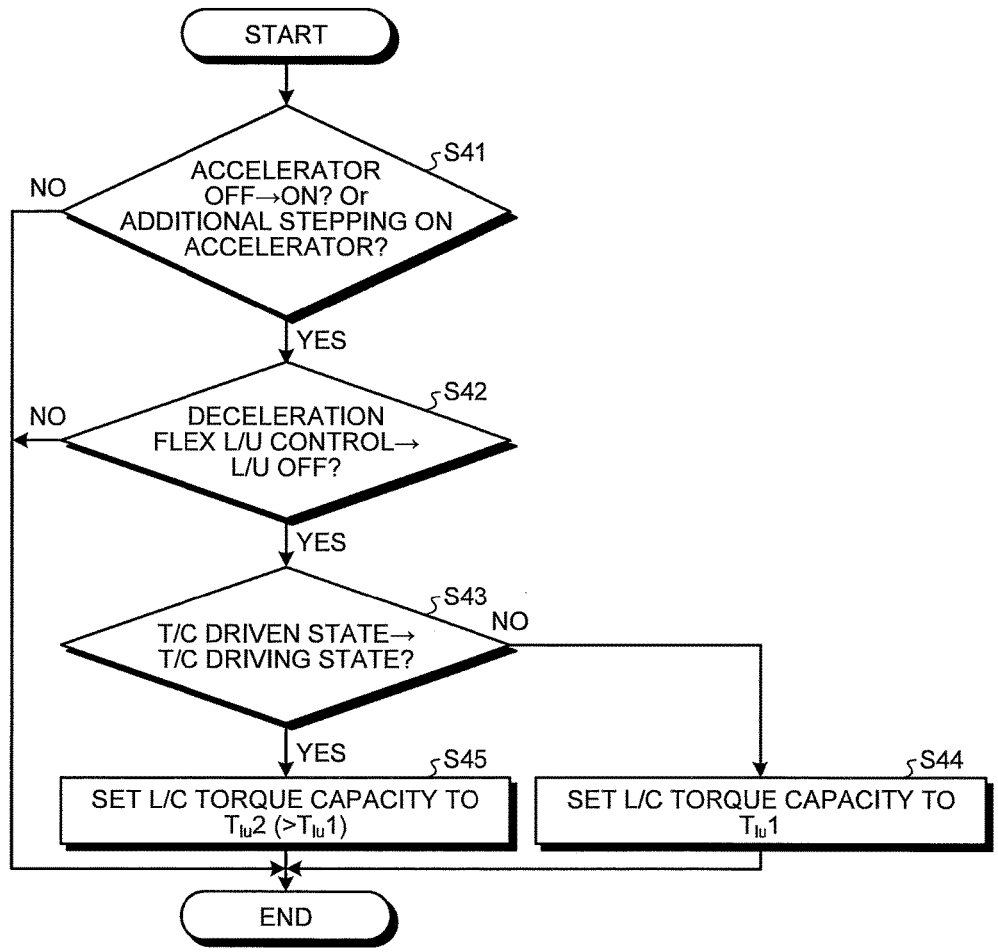
FIG. 12 is a flowchart illustrating a flow of a lock-up clutch control process according to a fifth embodiment of the disclosure.

At the end, operation of a control device 10 when executing a lock-up clutch control process according to a fifth embodiment of the disclosure is described with reference to FIGS. 12 to 13(f). FIG. 12 is a flowchart illustrating a flow of the lock-up clutch control process according to the fifth embodiment of the disclosure. FIG. 13(a) to FIG. 13(f) are timing charts for illustrating the lock-up clutch control process according to the fifth embodiment of the disclosure.

The flowchart illustrated in FIG. 12 starts when an ignition switch of a vehicle is switched from an off-state to an on-state and the lock-up clutch control process shifts to a process at step S41. The lock-up clutch control process is repeatedly executed in each predetermined control period while the ignition switch of the vehicle is in the on-state.

In the process at step S41, the control device 10 determines whether accelerator opening changes in an accelerating direction based on an output signal of an accelerator pedal sensor 20. As a result of the determination, when the accelerator opening changes in the accelerating direction (Yes at step S41), the control device 10 shifts the lock-up clutch control process to a process at step S42. On the other hand, when the accelerator opening does not change in the accelerating direction (No at step S41), the control device 10 finishes a series of lock-up clutch control processes.

In the process at step S42, the control device 10 determines whether a control state of a lock-up clutch 5 shifts from a deceleration flex lock-up control state to a disengaged (L/U OFF) state based on a lock-up line and a flex lock-up line determined in advance. As a result of the determination, when the control state of the lock-up clutch 5 shifts from the deceleration flex lock-up control state to the disengaged state (Yes at step S42), the control device 10 shifts the lock-up clutch control process to a process at step S43. On the other hand, when the control state of the lock-up clutch 5 does not shift from the deceleration flex lock-up control state to the disengaged state (No at step S42), the control device 10 finishes a series of lock-up clutch control processes.

In the process at step S43, the control device 10 determines whether a state of a torque converter 4 is a driven state based on a current speed ratio. As a result of the determination, when the state of the torque converter 4 is the driven state (Yes at step S43), the control device 10 determines that the state of the torque converter 4 shifts from the driven state to a driving state and shifts the lock-up clutch control process to a process at step S45. On the other hand, when the state of the torque converter 4 is the driving state (No at step S43), the control device 10 determines that the torque converter 4 maintains the driving state and shifts the lock-up clutch control process to a process at step S44.

In the process at step S44, the control device 10 sets torque capacity $T_{lu}$ of the lock-up clutch 5 to torque capacity $T_{lu}1$. According to this, the process at step S44 is completed and a series of lock-up clutch control processes ends.

In the process at step S45, the control device 10 sets the torque capacity $T_{lu}$ of the lock-up clutch 5 to torque capacity $T_{lu}2$ (>torque capacity $T_{lu}1$). Specifically, the control device 10 makes the torque capacity $T_{lu}$ of the lock-up clutch 5 larger than that when the driving state is maintained (curve L3 illustrated in FIG. 13(d)) as indicated by curve L4 in FIG. 13(d) such that output torque of the torque converter 4 rapidly increases. According to this, a blow-up amount of an engine speed does not increase as indicated by curve L5 in FIG. 13(e) and the engine speed becomes stable as indicated by curve L6 in FIG. 13(e). Meanwhile, curve L7 illustrated in FIG. 13(e) indicates a turbine speed. Vehicle acceleration does not oscillate by torque shock as indicated by curve L8 in FIG. 13(f) and the vehicle acceleration becomes stable as indicated by curve L9 in FIG. 13(f). According to this, the process at step S45 is completed and a series of lock-up clutch control processes ends.

As is clear from the description above, in the lock-up clutch control process according to the first to fifth embodiments of the disclosure, the control device 10 makes the slip-engagement amount when the state of the torque converter 4 is the driven state larger than that when the state of the torque converter 4 is the driving state when the accelerator opening of the vehicle changes in the accelerating direction. According to this, it is possible to inhibit fluctuation of the torque on the output shaft of the torque converter 4 due to rapid change in the torque capacity of the torque converter 4 with the change in the state of the torque converter 4, so that it is possible to inhibit the blow-up amount of the engine speed from increasing and inhibit occurrence of the torque shock when the acceleration control starts.

In the lock-up clutch control process according to the first to fifth embodiments of the disclosure, the control device 10 estimates the delay time elapsed before the hydraulic pressure of the lock-up clutch 5 reaches the hydraulic pressure corresponding to the hydraulic pressure command value and advances the timing to make the torque capacity $T_{lu}$ of the lock-up clutch 5 larger by the estimated delay time, so that it is possible to inhibit the deterioration in the controllability with the delay in the torque capacity $T_{lu}$ of the lock-up clutch 5.

The control device of the lock-up clutch according to the disclosure changes the slip-engagement amount of the lock-up clutch according to whether the state of the fluid-type power transmitting device when there is acceleration request is the driven state or the driving state. According to such a configuration, it is possible to inhibit fluctuation of torque on an output shaft of the fluid-type power transmitting device due to rapid change in torque capacity of the fluid-type power transmitting device with change in the state of the fluid-type power transmitting device, so that it is possible to inhibit the blow-up amount of the engine speed from increasing and inhibit the occurrence of the torque shock when the acceleration control starts.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device of a lock-up clutch mounted on a vehicle including an engine, a transmission, a fluid-type power transmitting device interposed between the engine and the transmission, and the lock-up clutch provided on the fluid-type power transmitting device, the control device comprising:
a controller configured to increase a torque capacity of the lock-up clutch when an accelerator opening of the vehicle changes in an accelerating direction, and configured to make the torque capacity larger, when a state of the fluid-type power transmitting device is maintained in a driven state before and after the accelerator opening of the vehicle changes in the accelerating direction than when the state of the fluid-type power transmitting device is maintained in a driving state before and after the accelerator opening of the vehicle changes in the accelerating direction.

2. The control device of the lock-up clutch according to claim 1, wherein the controller estimates an elapsed delay time before a hydraulic pressure of the lock-up clutch reaches the hydraulic pressure corresponding to a hydraulic pressure command value and advances a timing to make the torque capacity larger by the elapsed delay time.

* * * * *